United States Patent [19]

Lukkarinen et al.

[11] Patent Number: 5,705,068
[45] Date of Patent: Jan. 6, 1998

[54] FEEDING SUSPENSION TO A DISC FILTER

[75] Inventors: Seppo Lukkarinen; Ari Pelkio, both of Savonlinna, Finland

[73] Assignee: Ahlstrom Machinery Oy, Helsinki, Finland

[21] Appl. No.: 468,808

[22] Filed: Jun. 6, 1995

[30] Foreign Application Priority Data

Jun. 10, 1994 [FI] Finland ................... 942730

[51] Int. Cl.⁶ ................... B01D 33/21
[52] U.S. Cl. ................... 210/331; 210/456
[58] Field of Search ................... 210/330, 331, 210/456, 406

[56] References Cited

U.S. PATENT DOCUMENTS

| | | | |
|---|---|---|---|
| 1,259,139 | 3/1918 | Salisbury | 210/331 |
| 1,685,118 | 9/1928 | Campbell | 210/330 |
| 2,086,635 | 7/1937 | Peterson | 210/331 |
| 2,406,065 | 8/1946 | Dickinson et al. | 210/331 |
| 4,704,206 | 11/1987 | Barra . | |
| 4,943,372 | 7/1990 | Kohonen | 210/330 |
| 5,422,005 | 6/1995 | Redl et al. | 210/330 |

FOREIGN PATENT DOCUMENTS

| | | |
|---|---|---|
| 2102344 | 5/1994 | Canada . |
| 407770 | 6/1920 | Germany . |
| 407 770 | 1/1925 | Germany . |

OTHER PUBLICATIONS

*Handbook for Pulp & Paper Technologists*, Smook, 1982, pp. 109–112 and 227–229.
Reference list of Disc Filters and drawings. 1994.
Hedemora Vacuum Disc Filters brochure, 1989.
Kvaerner Eureka, *Pulp & Paper News*, Kvaerner Eureka/Kvaerner Hymac Publication, No. 1, 1993.
Kvaerner Eurkea, *Pulp & Paper News*, Kvaerner Eureka/Kvaerner Hymac Publication, No. 3, 1993.

Primary Examiner—Robert Popovics
Attorney, Agent, or Firm—Nixon & Vanderhye P.C.

[57] ABSTRACT

A disc filter assembly includes a number of filter discs mounted in a vat by a horizontal shaft with an inter-disc volume between the discs. A feed mechanism is provided that makes it possible to feed the pulp suspension onto the surface of the liquid, directed toward the most concentrated pulp in the vat, in such a manner that the feed is insensitive to fluctuations of the suspension surface level in the vat. This is accomplished by feeding the suspension into the vat interior directly into each of the inter-disc volumes, as by using a chute (which may have the approximate configuration of a hollow triangular parallelepiped) for each volume. A header for supplying pulp suspension to the chutes may be mounted on or spaced from the sidewall of the vat, or above the vat.

27 Claims, 5 Drawing Sheets

FEEDING SUSPENSION TO A DISC FILTER

BACKGROUND AND SUMMARY OF THE INVENTION

Disc filters are common pieces of equipment in the pulp and paper industry for thickening cellulose pulp suspensions, being particularly common in filtering fine fibers from white water, and having a simple construction capable of thickening pulp to consistencies of about 10–12%.

Traditionally pulp is fed directly into a vat surrounding the discs as an overflow from a separate feed vessel positioned next to the filter vat, on the ascending side of the discs. An inherent feature of this arrangement is that the height of the weir sill changes as the level of liquid in the vat descends or ascends, and when the level of liquid in the vat is low, the weir sill can be too high. When the difference in levels is great and the suspension to be filtered contains certain chemical substances, such as sodium hydroxide, foaming is a significant problem.

Additionally, a characteristic feature of this type of filter assembly is that, while in the vat surrounding the discs, the material to be thickened tends to thicken on the surface of the liquid at the ascending side of the discs, especially in the wood processing industry. Then, the thickened pulp peels away the cake thickened on the ascending side of the sector, which causes problems with the operation of the filter and mechanically stresses the sector. A conventional overflow-type of feed flowing downwardly along the wall of the vat will not allow the low-consistency pulp to efficiently spread between the discs to dilute the volume of most concentrated pulp.

U.S. Pat. No. 4,704,206 discloses a disc filter assembly, in which the suspension to be treated is fed to a trough surrounding each disc. The bottom of the trough is provided with an opening wide enough to allow the disc to rotate. According to this patent the trough is arranged on the descending side of the disc, and the suspension to be treated is allowed to flow down to the trough along the surface of the disc. Nevertheless, this method still has the same problems as feed along the side of the vat, i.e. the foaming tendency of sodium hydroxide-containing pulp and the fact that the low-consistency pulp is not allowed to dilute the volume of higher consistency pulp forming near the opposite side of the vat.

According to the present invention, a disc filter assembly is provided, as well as a method of thickening cellulosic suspension using a disc filter assembly, which overcomes the problems associated with the prior art. According to the present invention the low consistency suspension being fed into the vat is fed directly into the volumes between each of the discs (and between the end discs and the sidewalls of the vat) through individual mechanisms. This results in a number of significant advantages which include the following:

It is possible to always feed the pulp onto the surface of the liquid by varying the size of the openings. No weir is necessary.

The feed flow can be directed towards the most concentrated pulp in the vat, located between the discs, diluting the most concentrated pulp.

The feed can remain constant regardless of the capacity of the assembly. This may be accomplished by varying the size and the number of openings through which the pulp is fed.

The assembly is insensitive to fluctuations of the surface level of suspension in the vat.

When chutes are utilized to introduce the suspension, the flow over the edge of the chutes can be optimized to be between 0–100%.

The feeding structure—such as the feed chute—may be used as part of the structural mechanism of the assembly, for example acting as a support for the discharge assembly from the vat.

According to one aspect of the present invention a disc filter assembly is provided comprising the following components: A plurality of filter discs each having a plurality of sectors. A vat for containing suspension, the vat having a sidewall, a top, a bottom, an interior, and an exterior. A suspension level being maintained within the interior. A substantially horizontal shaft mounting the discs for rotation within the vat so that the discs are horizontally spaced from each other, having an inter-disc volume therebetween, and so that at least a portion of each of the discs is disposed within the vat to contact suspension therewithin. And, feed means for feeding suspension to the vat interior directly into each of the inter-disc volumes.

While a number of different structures such as tubes, nozzles, conduits, and the like may be utilized as the feed means, preferably the feed comprises a chute extending into each of the inter-disc volumes. The chute may have the approximate configuration of a hollow triangular parallel-epiped including a pair of opposite substantially vertical sidewalls, a sloped front wall, and a substantially vertical rear wall. Each of the chutes typically has an open top. The rear wall of at least some of the chutes may comprise a portion of the vat sidewall, the chute being fastened to the vat sidewall, and/or at least one sidewall of at least one of the chutes may comprise a portion of a conventional suspension discharge assembly within the vat interior.

The plurality of discs typically also includes first and second end discs, the end discs each horizontally spaced from a portion of the vat sidewall with an end volume therebetween, and the feed means also comprises means for feeding suspension to the vat directly into the end volumes. This may also comprise the chutes described above, in which case at least one sidewall of each of the chutes feeding into each end volume typically comprise a portion of the vat sidewall. The front wall of at least some of the chutes comprises a flow through opening through which suspension flows into the interior of the vat with a major velocity component toward the shaft.

In one embodiment the vat sidewall may have a through extending opening formed therein at the location of each of the chutes so that suspension may pass through the openings from exteriorly of the vat sidewall into the chute. The feed means may further comprise a header mounted to the vat sidewall exteriorly of the vat and having an opening therein corresponding to each of the through extending openings formed in the sidewall, or the feed means may alternatively comprise a header disposed exteriorly of the vat and having a plurality of feed conduits extending outwardly therefrom, a feed conduit connected to each of the openings in the vat sidewall. Alternatively the feed means may comprise a header mounted above the vat top and a plurality of feed conduits extending downwardly from the header, e.g. so that each of the feed conduits introduces suspension into each of the chutes at a level below the level of suspension normally maintained therein, or alternatively directly into the inter-disc volume.

The chutes may each include an upper edge that is substantially horizontal and over which suspension overflows when passing into the vat interior. The upper edge may have overflow openings therein through which suspension is introduced into the interior. The overflow openings may be adjacent the sidewall in addition to being at the front portion of the chute.

According to another aspect of the present invention a disc filter assembly is provided comprising the following components: A plurality of filter discs each having a plurality of sectors. A vat for containing suspension, the vat having a sidewall, a top, a bottom, an interior, and an exterior, a suspension level being maintained within the interior. A substantially horizontal shaft mounting the discs for rotation within the vat so that the discs are horizontally spaced from each other, having an inter-disc volume therebetween, and so that at least a portion of each of the discs is disposed within the vat to contact suspension therewithin. And, a chute extending into each of the inter-disc volumes from the vat sidewall. The details of the chute may be as described above.

The invention also relates to a method of thickening cellulosic suspension (e.g. to a maximum consistency of about 10–12%) using a disc filter assembly such as described above. The method comprises the following steps: (a) Maintaining a suspension level within the interior of the vat. (b) Drawing a suction through the shaft so that liquid from the suspension is withdrawn from the vat through the shaft while solids in the suspension are prevented from passing through the shaft by the filter discs. (c) Rotating the shaft so as to change the filter disc sectors below the level of suspension in the interior of the vat. And, (d) feeding suspension to the vat interior directly into each of the inter-disc volumes.

The method may be practiced using a header located above the vat in which case step (d) is practiced by introducing suspension from the header into each of the inter-disc volumes, either directly or through a chute. The invention also preferably comprises the further step of feeding suspension to the vat directly into the end volumes between the discs and the vat sidewall. Where the method is practiced using a header located adjacent the vat sidewall and a plurality of chutes, step (d) is practiced by introducing suspension from the header through the sidewall into each of the chutes below the level of suspension therein. Where each chute has a front wall with an overflow opening therein, the front wall remote from the vat sidewall, step (d) is practiced to introduce suspension through the overflow openings of the chutes into the interior of the vat, with a major velocity component toward the shaft.

Step (c) is typically practiced to rotate the filter disc sectors so that they move upwardly ("ascend") in the vat at one side of the vat. Step (d) is typically and preferably practiced at the side of the vat where the filter disc sectors move upwardly, rather than at the other side of the vat (where the filter disc sectors move downwardly ("descend")).

It is the primary object of the present invention to provide an advantageous disc filter assembly and method of operation thereof overcoming a number of drawbacks associated with prior art disc filter assemblies. This and other objects of the invention will become clear from an inspection of the detailed description of the invention and from the appended claims.

BRIEF DESCRIPTION OF THE DRAWINGS

FIG. 2A is a side view, partly in cross-section and partly in elevation, of a novel feed means according the present invention utilized in an otherwise conventional disc filter assembly, while

DETAILED DESCRIPTION OF THE DRAWINGS

Figure 1:
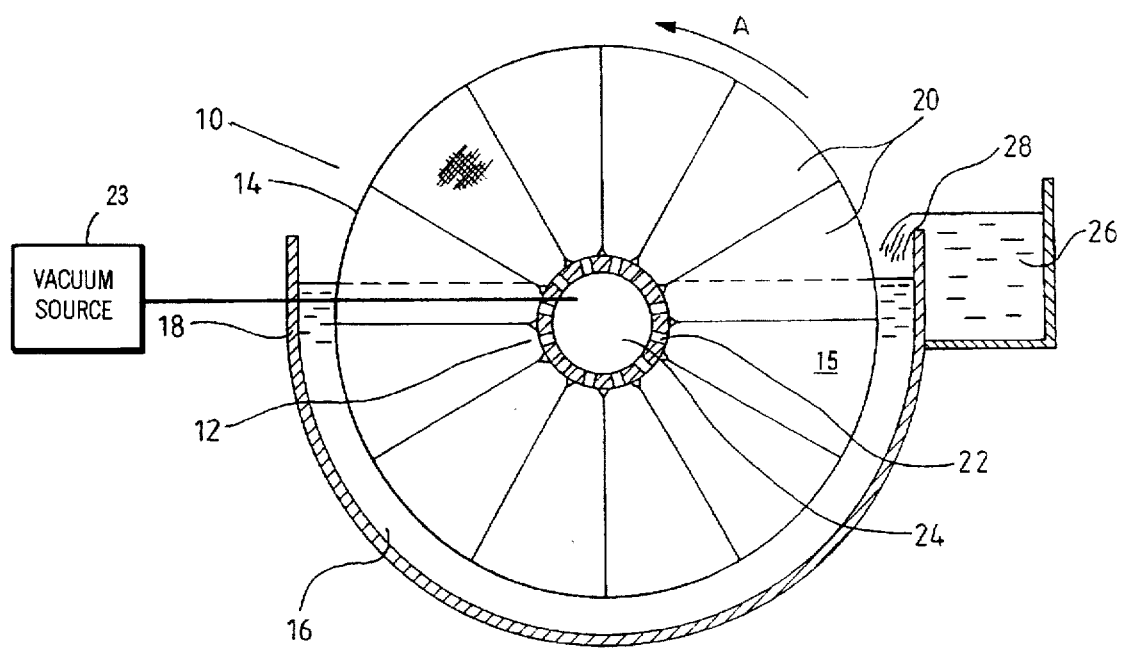
FIG. 1 is a side view, partly in cross-section and partly in elevation, of an exemplary prior art disc filter assembly over which the invention is an improvement.

As is shown in FIG. 1, a prior art disc filter assembly 10 comprises a plurality of parallel discs 14 fastened to a horizontal shaft 12 with a vat 16 surrounding the discs at their lower parts, the vat 16 having a bottom 17, sidewall 18, and open top 19, defining an interior and exterior. The discs 14 are substantially horizontally spaced along shaft 12 and have inter-disc volumes 15 therebetween. Advantageously, the shaft 12 is supported at its ends by the end portions 18' (see FIG. 3A) of sidewall 18 of the vat 16. The sidewall 18 top 19 of the vat 16 ascends to about the level of the shaft 12, advantageously even slightly above. The discs 14 of the filter assembly 10 consist of a plurality of adjoining wire-covered sectors 20, the hollow inside of which is connected by means of flow channels 22 the inside of the shaft 12, the inside either comprising a uniform hollow volume 24 or a number of flow channels. The flow channel/s 24 of the shaft 12 are usually connected to vacuum or suction source 23, such as a drop leg, vacuum pump or a centrifugal pump. The source 23 effects a pressure difference (i.e. suction), which causes liquid to be withdrawn from the filtered material through shaft 12.

The assembly 10 of FIG. 1 further comprises a conventional feed plenum 26 for the suspension to be treated from which it is introduced in the vat 16 as an overflow over the edge 28 of the vat 16. The water showers and atmospheric ports typically associated with assembly 10 are not shown in FIG. 1 since they do not relate the invention, but are provided in a complete assembly. Depending on the height difference of the level of material in the vat 16 and the edge 28, the material can in some circumstances start to foam. Another drawback of the prior art assembly of FIG. 1 is that the material to be fed in the vat 16 flows the vat 16 along its wall 18, whereby it does not dilute the high-concentration layer between the discs.

Figure 2A:
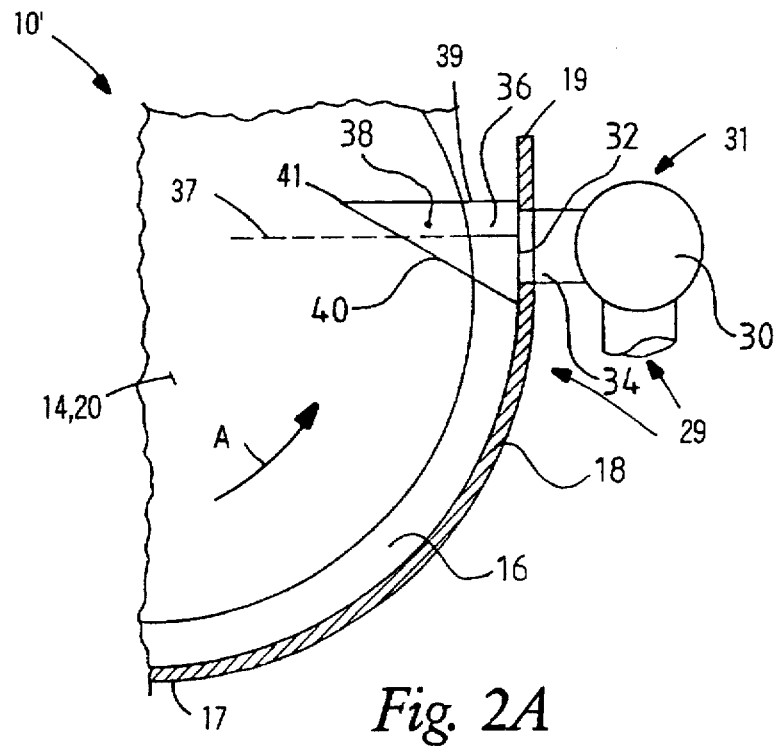
Figure 3A:
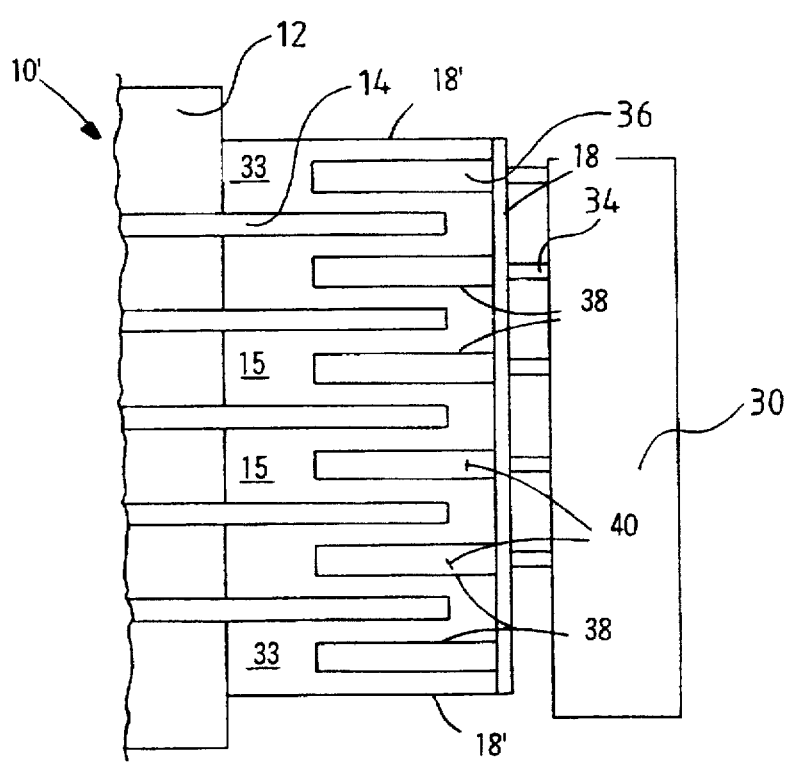
FIGS. 3A and 3B are top plan detail views of the feed means of FIGS. 2A and 2B, respectively.

In an advantageous embodiment of the invention shown in FIGS. 2A and 3A the disc filter assembly 10' is otherwise similar to that in FIG. 1, but the feed plenum extending the length of the filter in FIG. 1 on the outside of the vat has been removed and replaced by novel feed means 29. In this embodiment the novel feed means 29 include a header tube assembly 31 located beside the vat 16. The header tube assembly 31 comprises a feed tube 30, advantageously connected by means of feed conduits 34 to openings 32 coinciding with the inter-disc volumes 15 between each pair of discs 14 as well as with the end volumes 33 defined by end discs 14 and the end portions of vat sidewall 18. The openings 32 are positioned in the wall 18 of the vat 16 so that, for example, their centers coincide with the average surface level 37 of suspension in the vat 16. Each feed chute 36 is preferably mounted (e.g. welded) to the inside of the wall 18 of the vat 16, which according to the advantageous embodiment shown in FIGS. 2A and 3A has the approximate configuration of a (right) triangular parallelepiped; each chute 36 may have two substantially vertical triangular side surfaces 38, located substantially perpendicular the wall 18 of the vat 16 and an inclined front end 40, the inclination angle of which is, preferably about 30°–45°. The front end 40 is fastened to or near the sidewall 18 adjacent the lower corner of the opening 32, and the side surfaces 38 rise upwardly along sidewall 18 therefrom. Thus, one edge of each of the side surfaces 38 is fastened the wall 18 of the vat, the top edge 39 is essentially perpendicular the wall 18 and is advantageously parallel with the surface 37 of the suspension in the vat 16, while the third edge of each surface 38 is connected to the ascending front end 40. In this embodiment the rear end of the chute 36 is the sidewall 18 (substantially vertical at that point), and the top of chute 36 is open.

Front end 40 is fastened by one of its edges the sidewall 18 of the vat 16 and, as previously explained, the lower edges of the side surfaces 38 of the feed chute 36. Each feed chute 36 extends into an inter-disc volume 15, between a pair of filter discs 14, with an additional chute 36 in each end volume 33. Thus each chute 36 introduces fresh (relatively dilute) suspension directly into an inter-disc volume 15, i.e. directly into much less dilute suspension, with a (major) velocity component toward the shaft 12. A significant feature of this embodiment of the invention is that the free end edge 41 of each feed chute 36 is practically always located above the suspension surface 37 in the vat 16, although the assembly 10' will also function faultlessly when the feed chute 36 is occasionally totally submerged in the treated suspension.

Figure 2B:
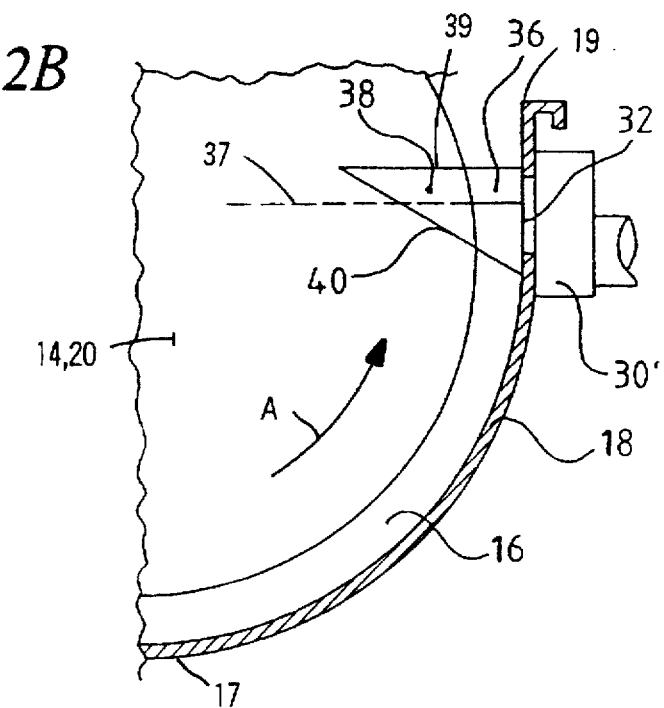
FIG. 2B is a view like that of FIG. 2A only of a second exemplary embodiment according the present invention.
Figure 3B:
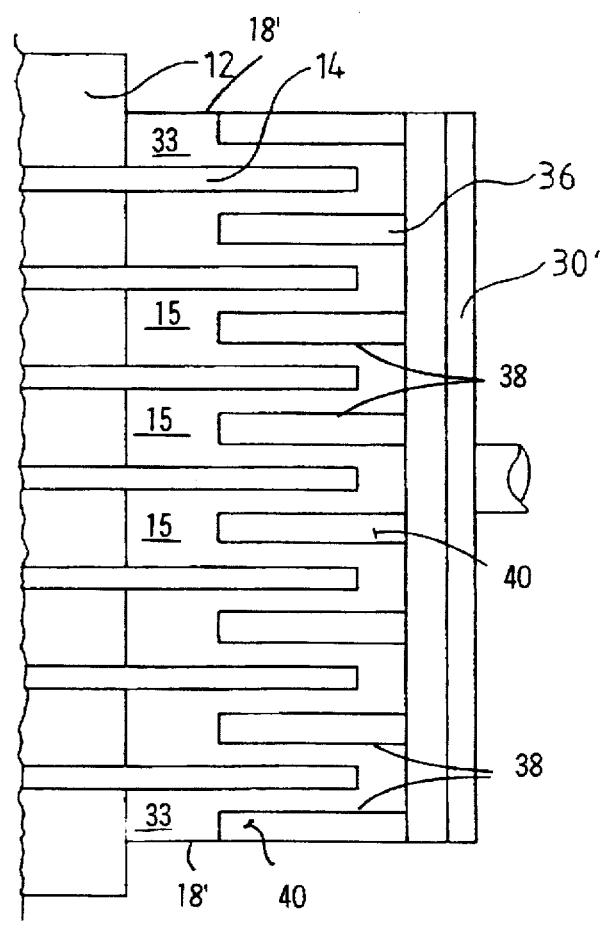

FIGS. 2B and 3B show another advantageous embodiment of a disc filter according the invention, in which the feed plenum 30' is mounted directly the side of the vat 16 so that the tubular feed conduits 34 as described in FIGS. 2A and 3A are unnecessary. Rather suspension is fed directly through the openings 32 in the wall 18 between the vat 16 interior and the feed plenum 30'.

According to yet another advantageous embodiment (shown in FIG. 4) the front end 40 of the feed chute 36 is welded at its upper part the sidewalls 38 of the feed chute 36 and provided with a rectangular opening 42, through which the introduced suspension may flow to essentially the same level as the surface 37 of the suspension in the vat 16, which prevents the forming of a detrimental flow weir. A characteristic feature of this advantageous embodiment of the invention is that the opening 42 extends vertically to practically below the surface 37 of the suspension in the vat 16. In this embodiment the side surfaces 38 are each provided with a small opening 44 in the free edge area adjacent the wall 18 of the vat 16. These openings 44 are not necessary to achieve the objects of the invention, but they are useful in some special applications. Accordingly, it is possible to provide the free edge of the side surfaces 38 as well as the front end 40 with a plurality of openings, by making, e.g., crenelated or rounded indentations so that the introduced suspension can be discharged evenly along the whole length of the sidewall 18. The size of the openings (e.g. 42, 44), their height, width, form, shape, and relative location between the side surfaces 38, and the front end 40, define the main feed directions of the introduced suspension to be treated.

Figure 4:
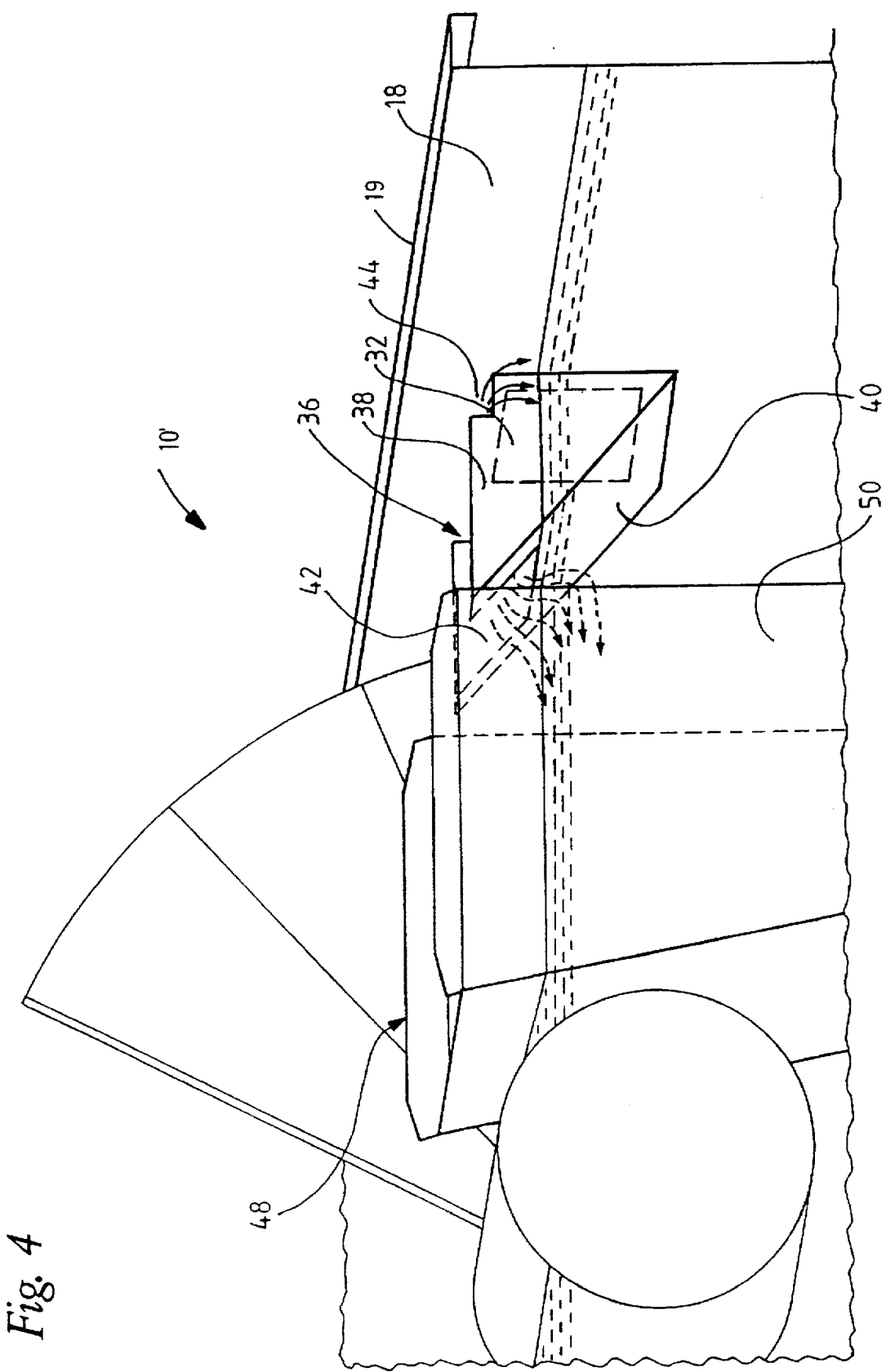
FIG. 4 is a detail perspective view showing another exemplary embodiment of feed means according the present invention associated with otherwise conventional disc filter assembly components.

FIG. 4 also shows still another advantageous structure according the invention. The discharge assembly 48 for thickened (e.g. to a maximum of about 10–12%) suspension is located between the shaft 12 and the feed chute 36. The result of this is that the suspension being fed from the opening 42 of the feed chute 36 collides against the wall 50 of the discharge assembly 48 and spreads evenly in every direction, thus effectively diluting the zone of thicker suspension that tends to gather on the surface of the suspension. Also, the suspension feed chute 36 can be fastened by its front part, i.e. by the free end of the front end 40, the discharge assembly 48, whereby the stability of the whole filter assembly 10' is greatly improved.

Figure 5:
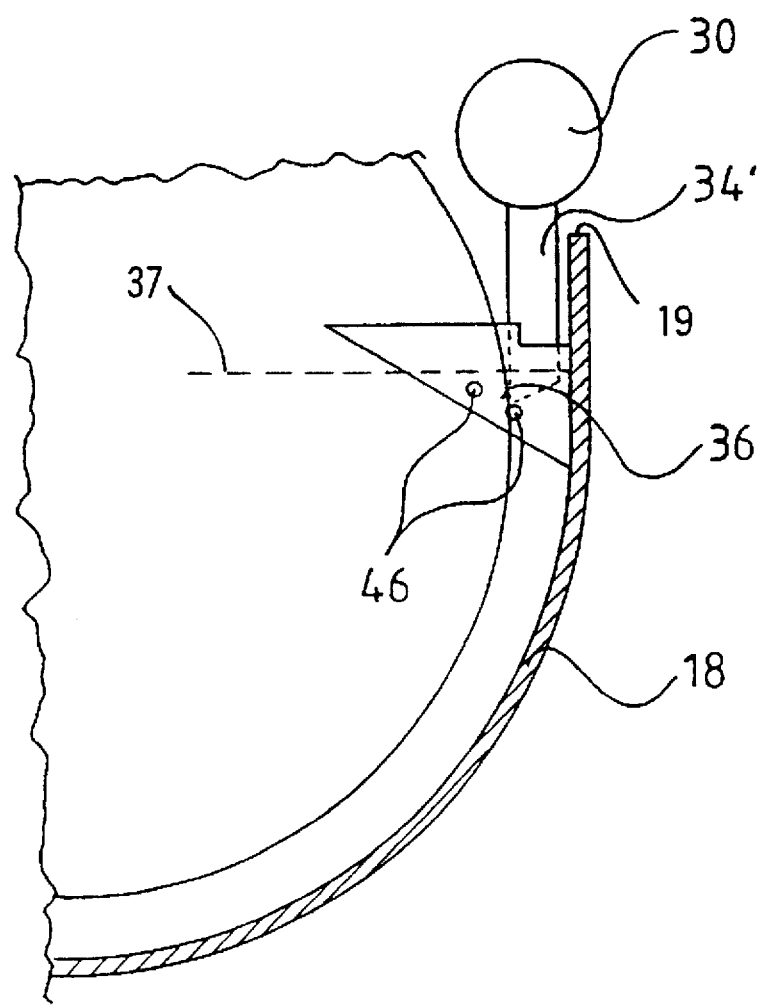
FIG. 5 is a view like that of FIG. 2A only showing yet another exemplary embodiment according the present invention.

FIG. 5 shows yet another exemplary embodiment of the invention. In this embodiment, the feed header component of the feed means is in a position substantially above at least the vat 16 top 19, so that no holes need be cut in the sidewall 18 of the vat 16 for introduced suspension. From the feed plenum 30, the material to be treated is discharged via feed conduits 34' to the bottom of each of the feed chutes 36, advantageously to below the level of the suspension in each chute 36, to avoid foaming. The end of the conduit 34' can be shaped into a form for directing the flow into the chute 36 in a desired way. FIG. 5 also shows how the side surfaces 38 of the chute 36 can be provided with openings 46, which can—if so desired—be situated below the surface 37 of the suspension in the vat 16. It is also possible to provide the front end 40 of the chute 36 with corresponding openings.

According to the invention, it is possible to always feed the pulp to the surface 37 of the suspension in the vat 16 by varying the size of the openings 42, 44, 46. Additionally, it is easy to make the openings 42, 44, 46 adjustable in size so as to suit the particular suspension to be treated and the desired capacity of the assembly 10'. Thus, it is possible to optimize the volume of flow over the side of the feed chute 36, so that the volume of suspension overflowing the top surface 39 can vary from 0–100%. The apparatus according to the invention is insensitive to changes in the level 37 of suspension in the vat 16. Even in extreme cases, in which the level 37 in the vat 16 ascends to be level with the side of a chute 36 or even to flow over it, the feed flow still spreads evenly to every direction.

In the above-mentioned embodiments the feed chute 36 is shown with primarily an end discharge, i.e. feeding towards the shaft 12 of the discs 14. The reason for this is that the inter-disc volume 15 is limited in width, typically only about 300–400 mm. Therefore a strong side-discharging flow would collide with the sectors 20 and undesirably peel the cake off the surfaces of the sectors 20. Therefore the sides 38 of chute 36 are typically spaced from each other less than about 300 mm, and primarily direct the flow toward shaft 12.

As the above description demonstrates, a novel disc filter assembly capable of eliminating a number of the disadvantages of prior at filter assemblies has been developed. The number, size and positioning of the openings can be arbitrarily chosen, as the capacity and other demands of the process dictate. This also applies to the shape of the chute 36, or alternative feed means (e.g. nozzle, conduit, pipe, perforated tube, etc.). It is also to be noted that only a few desirable embodiments of a disc filter assembly according to the invention have been described above, and that they are by no means to be interpreted as limiting the protection of the invention, the scope of the protection being only defined by the appended claims. Thus, it is clear that the shape of the chute, for example, can greatly differ from that shown above, it can be curvilinearly shaped, having, e.g. a bottom curved in cross-section, even semi-cylindrical or completely box-lie. The only limiting factors to the shape, size and construction of the chute are the space available and the fact that the openings in the walls of the chute are located essentially adjacent the surface of the liquid and at least partly below it. It is also possible to position the above-described feed means for the suspension to be treated on the opposite side of the filter, i.e. the descending side of the filter discs 14, but thereby some of the advantages of the novel feed means of the invention would be lost.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A disc filter assembly comprising:

a plurality of filter discs each having a plurality of sectors;

a vat for containing suspension, said vat having a sidewall, a top, a bottom, an interior, and an exterior, a first suspension level being maintained within said interior;

a substantially horizontal shaft mounting said discs for rotation within said vat so that said discs are horizontally spaced from each other, having an inter-disc volume therebetween, and so that at least a portion of each of said discs is disposed within said vat to contact suspension therewithin;

said vat sidewall comprising a first side where said discs descend into the suspension and a second side where said discs ascend from the suspension;

feed means for feeding suspension to said vat interior at said second side of said vat directly into each of said inter-disc volumes for diluting the suspension close to the suspension level at said second side of said vat;

said feed means comprising a chute extending into each of said inter-disc volumes, each said chute having a second suspension level substantially equal to the suspension level in said vat; and wherein each of said chutes has a side wall provided with at least one opening below said first suspension level in said vat.

2. A disc filter assembly as recited in claim 1 wherein said plurality of discs includes first and second end discs, said end discs each horizontally spaced from a portion of said sidewall of said vat, an end volume therebetween; and wherein said feed means also comprises means for feeding suspension to said vat directly into said end volumes.

3. A disc filter assembly as recited in claim 1 wherein said chutes are fastened to said vat sidewall.

4. A disc filter assembly as recited in claim 3 wherein said vat sidewall has a through extending opening formed therein at the location of each of said chutes so that suspension may pass through said openings from exteriorly of said vat sidewall into said chute.

5. A disc filter assembly as recited in claim 4 wherein said feed means further comprises a header mounted to said vat sidewall exteriorly of said vat and having an opening therein corresponding to each of said through extending openings formed in said sidewall.

6. A disc filter assembly as recited in claim 4 wherein said feed means further comprises a header disposed exteriorly of said vat, and having a plurality of feed conduits extending outwardly therefrom, a feed conduit connected to each of said openings in said vat sidewall.

7. A disc filter assembly as recited in claim 4 wherein said feed means comprises a header disposed exteriorly of said vat, and having a plurality of feed conduits extending outwardly therefrom, at least one corresponding to each of said inter-disc volumes.

8. A disc filter assembly as recited in claim 3 wherein said each of said chutes includes an upper edge having overflow openings therein through which suspension is introduced into said vat interior.

9. A disc filter assembly as recited in claim 8 wherein said overflow openings are remote from said sidewall, suspension overflowing from each of said chutes into said vat interior through said overflow openings toward said shaft with a major velocity component.

10. A disc filter assembly as recited in claim 1 wherein said feed means further comprises a header mounted above said vat top and connected each of said chutes by a feed conduit.

11. A disc filter assembly as recited in claim 10 wherein each of said chutes has an upper edge and wherein a level of suspension is normally maintained therein below said upper edge; and wherein each of said feed conduits introduces suspension into each of said chutes at a level below said level of suspension normally maintained therein.

12. A disc filter assembly as recited in claim 1 wherein said feed means comprises a header mounted to said vat sidewall exteriorly of said vat and having a plurality of openings therein, at least one corresponding to each of said inter-disc volumes.

13. A disc filter assembly as recited in claim 1 wherein each of said chutes has the approximate configuration of a hollow triangular parallelepiped including a pair of opposite substantially vertical sidewalls, a sloped front wall, and a substantially vertical rear wall.

14. A disc filter assembly as recited in claim 13 wherein each of said chutes has an open top, and wherein said chute sidewalls are spaced from each other a distance of less than about 300 mm.

15. A disc filter assembly as recited in claim 13 wherein said rear wall of at least some of said chutes comprises a portion of said vat sidewall.

16. A disc filter assembly as recited in claim 13 further comprising a suspension discharge assembly in said vat interior; and wherein at least a portion of at least one of said chutes comprises a portion of said suspension discharge assembly within said vat interior.

17. A disc filter assembly as recited in claim 13 wherein at least one sidewall of at least one of said chutes comprises a portion of said vat sidewall.

18. A disc filter assembly as recited in claim 13 wherein said front wall of at least some of said chutes comprises a flow-through opening therein, through which suspension flows into said interior of said vat with a major velocity component toward said shaft.

19. A disc filter assembly comprising:

a plurality of filter discs each having a plurality of sectors;

a vat for containing suspension, said vat having a sidewall, a top, a bottom, an interior, and an exterior, a suspension level being maintained within said interior;

a substantially horizontal shaft mounting said discs for rotation within said vat so that said discs are horizontally spaced from each other, having an inter-disc volume therebetween, and so that at least a portion of each of said discs is disposed within said vat to contact suspension therewithin;

a chute extending into each of said inter-disc volumes from said vat sidewall, each of said chutes having the approximate configuration of a hollow triangular parallelepiped including a pair of opposite substantially vertical sidewalls, a sloped front wall, and a substantially vertical rear wall, and each chute being connected to a header; and wherein each of said chutes has a side wall provided with at least one opening below said first suspension level in said vat.

20. A disc filter assembly comprising:

a plurality of filter discs each having a plurality of sectors;

a vat for containing suspension, said vat having a sidewall, a top, a bottom, an interior, and an exterior, a suspension level being maintained within said interior;

a substantially horizontal shaft mounting said discs for rotation within said vat so that said discs are horizontally spaced from each other, having an inter-disc volume therebetween, and so that at least a portion of each of said discs is disposed within said vat to contact suspension therewithin;

a chute extending into each of said inter-disc volumes for feeding suspension to said vat interior directly into each of said inter-disc volumes;

a header mounted above said vat top and connected to each of said chutes by a feed conduit; and wherein each of said chutes has an upper edge and wherein a level of suspension is normally maintained therein below said upper edge; and wherein each of said feed conduits introduces suspension into each of said chutes at a level below said level of suspension normally maintained therein.

21. A disc filter assembly as recited in claim 20 wherein each said chute has a second suspension level substantially equal to the suspension level in said vat interior.

22. A disc filter assembly comprising:

a plurality of filter discs each having a plurality of sectors;

a vat for containing suspension, said vat having a sidewall, a top, a bottom, an interior, and an exterior, a suspension level being maintained within said interior;

a substantially horizontal shaft mounting said discs for rotation within said vat so that said discs are horizontally spaced from each other, having an inter-disc volume therebetween, and so that at least a portion of each of said discs is disposed within said vat to contact suspension therewithin;

a chute extending into each of said inter-disc volumes for feeding suspension to said vat interior directly into each of said inter-disc volumes, each of said chutes having the approximate configuration of a hollow triangular parallelepiped including a pair of opposite substantially vertical sidewalls, a sloped front wall, and a substantially vertical rear wall; and wherein at least some of said chutes have a side wall provided with a plurality of openings below the level of suspension in said vat.

23. A disc filter assembly as recited in claim 22 wherein each of said chutes has an open top, and wherein said chute sidewalls are spaced from each other a distance of less than about 300 mm.

24. A disc filter assembly as recited in claim 22 wherein said rear wall of at least some of said chutes comprises a portion of said vat sidewall.

25. A disc filter assembly as recited in claim 22 further comprising a suspension discharge assembly in said vat interior; and wherein at least a portion of at least one of said chutes comprises a portion of said suspension discharge assembly within said vat interior.

26. A disc filter assembly as recited in claim 22 wherein at least one sidewall of at least one of said chutes comprises a portion of said vat sidewall.

27. A disc filter assembly as recited in claim 33 wherein said front wall of at least some of said chutes comprises a flow-through opening therein, through which suspension flows into said interior of said vat with a major velocity component toward said shaft.

* * * * *